(12) United States Patent
Chen et al.

(10) Patent No.: US 7,065,255 B2
(45) Date of Patent: Jun. 20, 2006

(54) METHOD AND APPARATUS FOR ENHANCING DIGITAL IMAGES UTILIZING NON-IMAGE DATA

(75) Inventors: Keath T. Chen, Rochester, NY (US); Edward B. Gindele, Rochester, NY (US); Robert J. Wilson, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 703 days.

(21) Appl. No.: 10/139,728

(22) Filed: May 6, 2002

(65) Prior Publication Data

US 2003/0206231 A1    Nov. 6, 2003

(51) Int. Cl.
 *G06K 9/40* (2006.01)
 *G03F 3/10* (2006.01)

(52) U.S. Cl. ...................... 382/260; 358/527
(58) Field of Classification Search ............. 382/160, 382/167, 264, 278, 274, 275, 270, 260, 254; 358/3.26, 518, 519, 527; 348/96; 355/18
See application file for complete search history.

(56) References Cited

U.S. PATENT DOCUMENTS

| 5,081,692 A | 1/1992 | Kwon et al. ............... 382/263 |
| 5,508,783 A | 4/1996 | Iwagaki et al. .............. 355/40 |
| 5,515,104 A * | 5/1996 | Okada .................. 348/333.01 |
| 5,633,678 A | 5/1997 | Parulski et al. ........... 348/231.5 |
| 5,641,596 A | 6/1997 | Gray et al. .................... 430/21 |
| 5,917,578 A | 6/1999 | Nakamura ................... 355/40 |
| 5,923,775 A | 7/1999 | Snyder et al. .............. 382/172 |
| 6,038,011 A | 3/2000 | Ikenoue et al. ............... 355/40 |
| 6,110,332 A * | 8/2000 | Swierkowski ............... 204/242 |
| 6,115,104 A | 9/2000 | Nakatsuka .................... 355/40 |
| 6,180,312 B1 | 1/2001 | Edwards ..................... 430/140 |
| 6,297,870 B1 | 10/2001 | Nanba ......................... 355/18 |
| 6,324,345 B1 | 11/2001 | Enomoto .................... 396/311 |
| 6,353,713 B1 * | 3/2002 | Takahashi et al. .......... 396/315 |
| 6,804,393 B1 * | 10/2004 | Gindele et al. ............. 382/167 |
| 6,807,300 B1 * | 10/2004 | Gindele et al. ............. 382/167 |
| 6,813,389 B1 * | 11/2004 | Gindele et al. ............. 382/274 |
| 6,931,160 B1 * | 8/2005 | Gindele et al. ............. 382/261 |
| 6,934,421 B1 * | 8/2005 | Gindele et al. ............. 382/260 |

FOREIGN PATENT DOCUMENTS

| EP | 1 109 130 A2 | 6/2001 |
| EP | 1 111 907 A2 | 6/2001 |
| EP | 1 450 551 A1 | 8/2004 |

OTHER PUBLICATIONS

Lee, Digital Image Smoothing and the Sigma Filter, *Computer Vision, Graphics, and Image Processing* 24, 1983, pp. 255-269.

* cited by examiner

Primary Examiner—Kanjibhai Patel
(74) Attorney, Agent, or Firm—Thomas H. Close

(57) ABSTRACT

A method and apparatus for enhancing a digital image captured by a digital camera: provides one or more data selected from the group consisting of camera model type, image sensor type, type of light source, type of image compression, previous noise reduction processing history, previous spatial sharpening processing history, and camera noise magnitude; employs the one or more data to generate one or more noise processing parameters; and employs the one or more noise processing parameters to enhance the spatial detail of the digital image.

39 Claims, 3 Drawing Sheets

METHOD AND APPARATUS FOR ENHANCING DIGITAL IMAGES UTILIZING NON-IMAGE DATA

FIELD OF INVENTION

The present invention relates to enhancing the appearance of digital images generated by a digital camera through the use of non-image data recorded with the digital images.

BACKGROUND OF THE INVENTION

Many factors can affect the quality of photographic prints made from digital images. In particular, the noise characteristics of a digital image can have a serious impact on overall photographic print quality. For example, most digital image processing systems that manipulate the pixel data of a digital image prior to printing include a stage of spatial sharpening, i.e. enhancing the spatial detail in the image. For digital images that contain an excessive level of noise, this spatial sharpening operation can degrade the overall photographic print quality due to the amplification of the noise.

In general, it is difficult to determine the level of noise in a digital image from using only the pixel values of the digital image. In commonly assigned U.S. Pat. No. 5,923,775, Snyder et al. disclose a method of image processing which includes a step of estimating the noise characteristics of a digital image and using the estimates of the noise characteristics in conjunction with a noise removal system to reduce the amount of noise in the digital image. The method disclosed by Snyder et al. is designed to work for digital images derived from radiographic film and includes a multiple step process for the noise characteristics estimation procedure. This method is computationally complex and can fail for some digital images due to the difficulty of automatically separating image structure (scene content) from noise structure.

In commonly assigned U.S. Pat. No. 6,038,011 Ikenoue, et al. disclose a system for recording non-image information on a photographic film, reading the non-image information along with the image information, and using the non-image information to vary the appearance of photographic prints made from the image information read from the photographic film. The method disclosed by Ikenoue, et al. includes the steps of memorizing conversion tables for converting photographic data into coded data that can be used in a printer, a conversion table being prepared for each of the recording formats of the photographic data recorded on a recording medium such as photographic film; recording index data along with the photographic data, the index data being indicative of the recording format of the photographic data; reading the index data and the photographic data of an image frame when printing the image frame; selecting one of the conversion tables corresponding to the index data; converting the photographic data read according to the one of the conversion tables selected; obtaining photometric values from the image frame; and determining the print-exposure amount based on the converted photographic data and the photometric values. This method claims to improve the appearance of the photographic prints by use of the recorded index data that indicates the type of recording format. While the method disclosed by Ikenoue, et al. may improve the print quality in color and tone characteristics, it does not improve the spatial detail of the photographic prints.

In commonly assigned U.S. Pat. No. 5,917,578 Nakamura discloses an apparatus and method for a photographic process in which information regarding camera, lens, and film used in photographing are recorded on the film. According to Nakamura's method, the information recorded on the film is used to determine the state of deterioration in quality of a state of worsening of graininess of the image. Based on this information, Nakamura's method corrects the worsening of graininess of the image. Although Nakamura discloses a general framework that includes recording and using non-image information to improve the quality of a photographic print, Nakamura fails to disclose any practical means or method with which to achieve improved image quality results. Furthermore, Nakamura's disclosure does not include any details with regard to implementation of a method for a digital imaging system. Therefore, Nakamura's method cannot be implemented in a practical digital imaging system.

It is known to measure the noise characteristics of photographic film as scanned with a particular film scanner. It is also well known in the field of photography that the photographic speed, as indicated by the ISO speed (or equivalently the EI exposure index), is a useful indication as to the expected magnitude of film grain noise associated with photographic film products. In general, photographic films rated with higher ISO speeds have more noise than photographic films with lower ISO speeds. It is known in the art that the noise characteristics of photographic films can be measured and used to improve the appearance of the digital images produced by scanning a photographic film strip and using the measured noise characteristics to control a noise reduction filter. It is also known in the art that the measured noise characteristics for a given ISO speed can be generalized for many photographic film products that have either the same or similar ISO speed rating. Thus the ISO speed rating of the photographic film product can be used to select a measured noise characteristic from a database of measured noise characteristics that approximates the noise magnitude of the photographic film without having to measure the noise magnitude of the photographic film product.

It would be desirable to apply a similar technique to the processing of digital images captured by a digital camera. Unfortunately, the noise characteristics of digital cameras are not as consistent with respect to ISO speed as those of photographic film. Factors contributing to the inconsistency include: different noise characteristics between professional and consumer grade digital cameras having the same rated ISO speed; compression modes; image resolution (i.e. the number of pixels in the digital image); contrast settings; in camera spatial filtering operations (including sharpening, noise cleaning and color filter array processing); color white balance processing; and lighting mode (flash, tungsten, fluorescent, daylight). Many of these modes and settings that affect noise characteristics are user selectable.

There is a need therefore for an improved method of enhancing digital images produced by digital cameras.

SUMMARY OF THE INVENTION

The need is met according to the present invention by providing a method and apparatus for enhancing a digital image captured by a digital camera that provides one or more data selected from the group consisting of camera model type, image sensor type, type of light source, type of image compression, previous noise reduction processing history, previous spatial sharpening processing history, and camera noise magnitude; employs the one or more data to generate one or more noise processing parameters; and employs the one or more noise processing parameters to enhance the spatial detail of the digital image.

ADVANTAGES

It is an advantage of the present invention that the non-image data (i.e. non-pixel data) recorded along with a digital image produced by a digital camera can be used to enhance the appearance of the digital image in a manner that is specific to the digital image. According to one aspect of the invention the photographic speed indicated as non-image data can be used to enhance the spatial detail of the corresponding digital image. It is a further advantage that the non-image data relating to the image compression method used to encode the digital image is used to enhance the spatial detail of the digital image.

DETAILED DESCRIPTION OF THE INVENTION

In the following description, a preferred embodiment of the present invention will be described as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Figure 1:
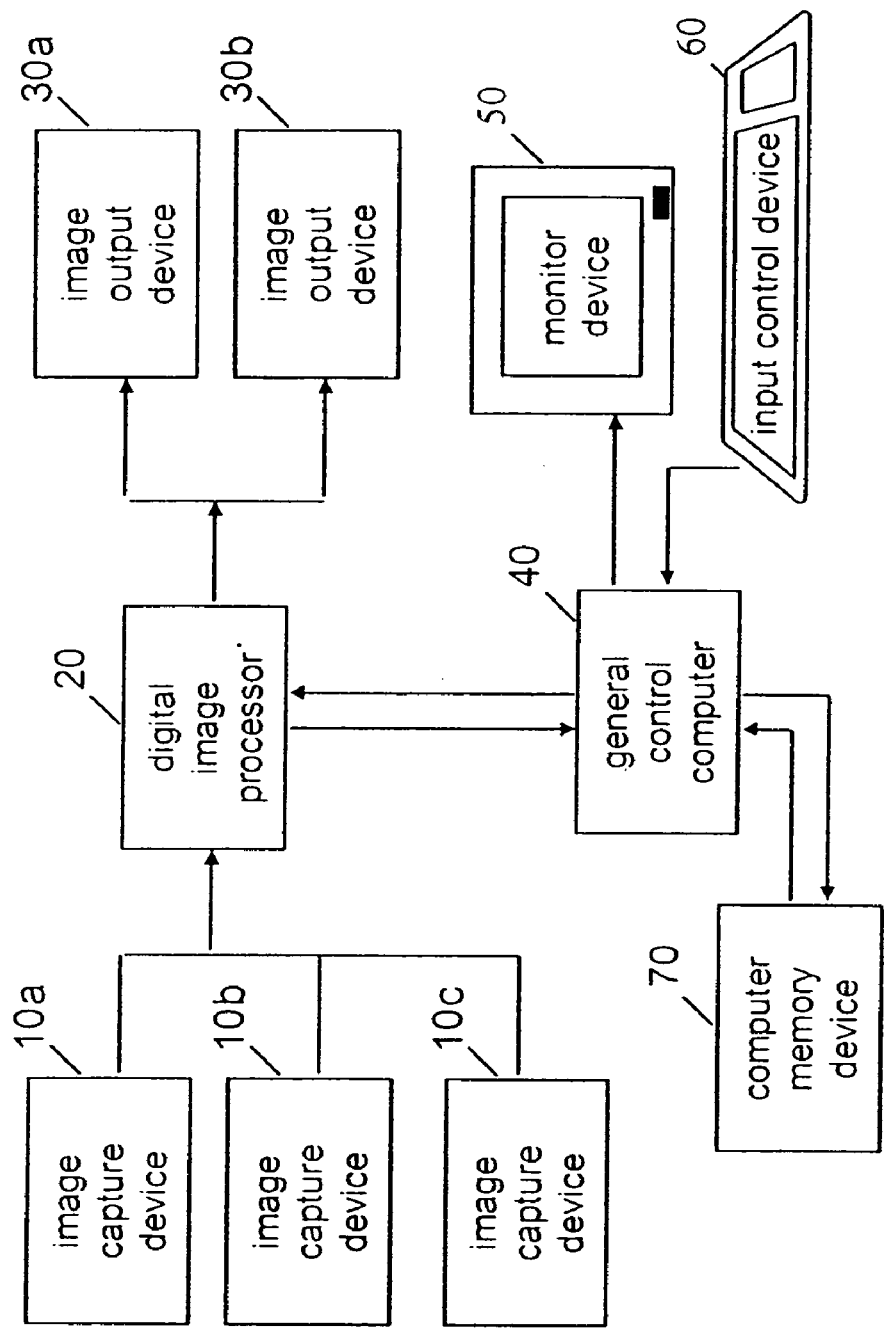
FIG. 1 is a functional block diagram showing the component parts of an apparatus which can implement the present invention.

The present invention can be implemented in computer hardware. Referring to FIG. 1, the following description relates to a digital imaging system which includes an image capture device 10a, an digital image processor 20, an image output device 30a, and a general control computer 40. The system can include a monitor device 50 such as a computer console or paper printer. The system can also include an input device control for an operator such as a keyboard and or mouse pointer 60. Multiple capture devices 10a, 10b and 10c are shown illustrating that the present invention can be used for digital images derived from a variety of imaging devices. For example, FIG. 1 can represent a digital photofinishing system where the image capture device 10a is a conventional photographic film camera for capturing a scene on color negative or reversal film, and a film scanner device for scanning the developed image on the film and producing a digital image. Image capture device 10b can be a digital camera while image capture device 10c can be a digital camera of a different model type from 10b. The digital image processor 20 provides the means for processing the digital images to produce pleasing looking images on the intended output device or media. Multiple image output devices 30a and 30b are shown illustrating that the present invention can be used in conjunction with a variety of output devices which can include a digital photographic printer and soft copy display. The digital image processor 20 processes the digital image to adjust the overall brightness, tone scale, image structure etc. of the digital image in a manner such that a pleasing looking image is produced by an image output device 30a. Those skilled in the art will recognize that the present invention is not limited to just these mentioned image processing modules.

The general control computer 40 shown in FIG. 1 can store the computer program that implements the present invention on a computer readable storage medium, which can comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention can also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention implemented in a combination of software and/or hardware is not limited to devices which are physically connected and/or located within the same physical location. One or more of the devices illustrated in FIG. 1 can be located remotely and can be connected via a wireless connection.

A digital image is comprised of one or more digital image channels. Each digital image channel is comprised of a two-dimensional array of pixels. Each pixel value relates to the amount of light received by the image capture device 10 corresponding to the geometrical domain of the pixel. For color imaging applications, a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications. In fact, the present invention can be applied to any two dimensional array of noise corrupted data. Although a digital image channel is described as a two dimensional array of pixel values arranged by rows and columns, those skilled in the art will recognize that the present invention can be applied to mosaic (non rectilinear) arrays with equal effect.

Figure 2:
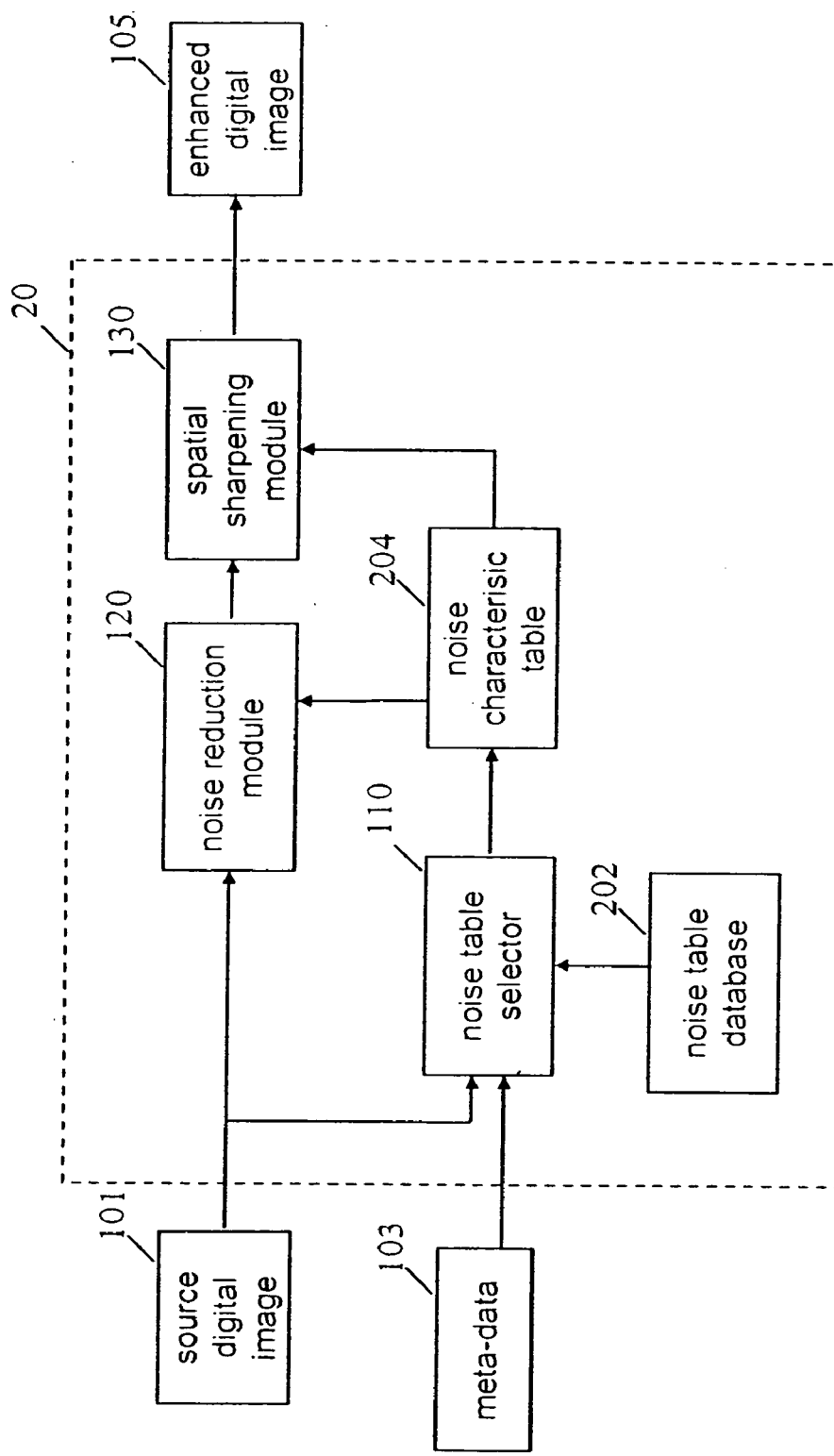
FIG. 2 is a functional block diagram of the digital image processor module employed in the preferred embodiment of the present invention.

The digital image processor 20 shown in FIG. 1 is illustrated in more detail in FIG. 2. The source digital image 101 is received by the digital image processor 20 which produces on output an enhanced digital image 105 by processing the pixels of the source digital image. The noise table selector 202 receives meta-data tags 103, i.e. non-image or non-pixel data recorded along with the source digital image 101. The meta-data tags 103, which can assume a variety of different forms as described hereinbelow, contains information about the conditions under which the camera generated the source digital image 101. For example, the camera ISO speed setting is received as a meta-data tag for the source digital image 101 which indicates the photosensitivity of the photosensitive device from which the source digital image 101 is derived. The noise table selector 110 uses the meta-data tags 103 to select a noise characteristic table 204 from a noise table database 202. The noise characteristic table 204 is received by one or more digital image processing modules which use the noise characteristic table 204 to process the pixel data of the source digital image 101. As shown in FIG. 2, one embodiment of the present invention uses two digital image processing modules, a noise reduction module 120 and a spatial sharpening module 130. The noise reduction module 120 receives the noise characteristic table 204 and enhances the spatial detail in the source digital image 101 by removing noise from the source digital image 101 through the application of a non-linear spatial filtering operation. Similarly, the spatial sharpening module 130 receives the noise characteristic table 204 and uses it to enhance the spatial detail of the processed digital image from the noise reduction module 120 through the use of a different non-linear spatial filter that amplifies the image signal without amplifying the noise. The final processed digital image produced by the digital image processor is enhanced digital image 105. While the previously described embodiment of the present invention uses a noise reduction module and a spatial sharpening module to enhance the appearance of the processed digital image, those skilled in the art will appreciate that the present invention is not limited to these two forms of digital image processing modules.

The noise characteristic table 204 referred to in FIG. 2 is used as an indication of the expected magnitude of noise present in the source digital image 101. The preferred embodiment of the present invention uses a table of standard deviation values as a function of the pixel color and pixel value to characterize the expected noise magnitude associated with the source digital image 101. The noise present in the source digital image 101 is approximated as having a Gaussian distribution with a magnitude which is color (pixel color) and intensity (pixel value) dependent. As such, a Gaussian distribution can be characterized by a single parameter value—a standard deviation. An example of a noise characteristic table 204 that can be used with the present invention is shown below in Table 1.

TABLE 1

| average pixel value | Standard deviation of red channel | Standard deviation of green channel | Standard deviation of blue channel |
|---|---|---|---|
| 16 | 3.28 | 3.62 | 3.21 |
| 48 | 3.71 | 3.20 | 3.38 |
| 80 | 3.77 | 4.14 | 4.50 |
| 112 | 4.57 | 4.35 | 4.21 |
| 144 | 4.98 | 4.25 | 4.37 |
| 176 | 5.05 | 4.11 | 6.21 |
| 208 | 5.05 | 5.64 | 6.29 |
| 240 | 2.71 | 4.27 | 3.87 |

The values of the noise characteristic table 204 are representative of the expected noise magnitude for a digital image. The entries of Table 1 are given for each color of pixels, (red, green, and blue) and for different ranges of pixel values, i.e. as a function of pixel value. For example, for red pixels that range in value between 0 and 31 (mid-way between table entry values) the expected noise magnitude indicated is 3.28 pixel code values root-mean-square variation (standard deviation). The noise characteristic table shown in Table 1 does not have an entry for each possible pixel value. The preferred embodiment of the present invention uses the nearest table entry value to the pixel value being processed. It is also possible to interpolate the values in Table 1 to produce a new noise characteristic table 204 that has an entry for each possible pixel value.

Those skilled in the art will appreciate that other measures of noise magnitude can be used with the present invention, such as but not limited to the half-width or 95 percent width of the noise distribution. Furthermore, the present invention can be used with more complicated noise characteristic tables that would relate to a noise source of a non-Gaussian distribution.

A noise characteristic table for a digital camera can be generated by photographing, with uniform daylight illumination, a test target chart that includes a series of flat patch targets having different reflectance values. Those skilled in the art will recognize that other illumination sources can also be used to photograph the test target chart. The resulting digital image will have several regions of nearly uniform density areas, or uniform patches, depending on the number of flat patch targets in the test target chart. The average pixel value and the standard deviation of the pixel values for each color of pixels corresponding to each flat patch target is measured with a statistical analysis computer tool. The standard deviation value and average pixel value relationship is a characteristic relationship of the noise magnitude representative of the digital camera and, among other aspects, ISO speed setting. The standard deviation values are tabulated as a function of the average pixel value into a form as shown in Table 1.

For each flat patch target, the standard deviation value is derived directly from a cropped portion of a flat patch target using approximately several hundred or thousand of pixel values. Improved results are obtained by taking precautions to prevent some types of structure contamination, or noise characteristics not related to the average camera noise behavior. For example, sometimes camera sensors can show pixel values far away from the average of the flat patch target. Such bad pixel values can be detected by the magnitude pixel difference from the average being unusually large. A cut-off pixel difference threshold as a multiple of the standard deviation is defined. Pixel values larger than this cut-off pixel difference threshold from the average are discarded. The standard deviation value is then calculated a second time with the pixel values that have not been discarded. Another type of structure contamination is low frequency noise, such as produced by scene lighting gradients or material reflectance variations in the flat patch targets. Although the flat patch targets are made with great care to be as uniform as possible, they can still contain low frequency variation in their reflectance properties. One way to reduce these low frequency components is by collecting statistics of smaller regions within the pixel regions corresponding to the flat patch targets. For example, a 5 by 5 window of pixels can be used to calculate a local pixel average. This local pixel average is then subtracted from the pixel values. Next the local standard deviation of the window of pixels is calculated. This calculation is performed as a sliding window which produces unique local standard deviation values corresponding to each pixel location. The collection of local standard deviation values of all 5 by 5 regions corresponding to the flat patch target is analyzed and the median of this collection of standard deviation values is used as the representative standard deviation value for the noise characteristic table value. The median of standard deviation values better relates to the high frequency noise. The window size can be chosen to calculate noise standard deviation values that relate to different spatial frequency ranges.

The noise properties of each digital camera are a function of the various modes in which the digital camera can be operated. For example, the digital camera photographic light sensitivity, as indicated by the meta-data tag ISO (International Standards Organization) speed setting can greatly affect the magnitude of the noise present in the digital images produced with the digital camera. Other operational algorithms within the digital camera can also affect the noise magnitude such as the image compression algorithm, an in-camera noise reduction algorithm, an in-camera spatial sharpening algorithm, and a white balance algorithm. Still other operational modes can also affect the magnitude of the expected noise such as the pixel resolution setting. Each digital camera has a default setting for each operational mode and/or algorithm. Typically a digital camera is set up for the highest pixel resolution, a mild JPEG compression, daylight source, and an auto white balance algorithm. Some cameras may be set up with different default settings while others may have the ISO speed setting set automatically. That is, by measuring the available light from the original scene image, the digital camera internal logic decides the appropriate ISO speed setting which then checks for an appropriate shutter speed and aperture size that will deliver such an ISO speed setting. Other cameras allow users to choose ISO speed setting, with or without auto ISO speed setting available.

After characterizing many digital cameras at various operational settings, it was concluded that the noise properties of the digital images produced, varied most significantly as a function of ISO speed setting. For example, the generated noise characteristic table corresponding to ISO speed setting of 100 and 400 for one camera varied by a factor of 3. However, the generated noise characteristic tables corresponding to a ISO speed setting of 100 derived from many digital cameras are within 80% of each other. By using an average noise characteristic table for ISO speed setting 100, the maximum error was calculated for the group of tested digital cameras as 40 percent. Other average noise characteristic tables were generated for the data corresponding to ISO speed settings of 200, 400, and 800. It should be noted that digital cameras intended for professional use tend to have lower noise magnitudes.

The method described above is used to generate a noise characteristic table for a particular digital camera for different ISO speed settings. The above procedure is repeated for each ISO speed setting that the particular digital camera allows. Thus the noise table database 202 includes noise characteristic tables that relate to different ISO speed settings for a given digital camera. This procedure of generating a set of noise characteristic tables for a particular digital camera is repeated for other particular camera models. Since the noise properties of different camera units of the same camera model are similar, it is only necessary to generate a set of noise characteristics for the digital camera model.

The noise characteristic table 204 is selected based on the ISO speed setting meta-data tag and camera model as indicated by a camera model type meta-data tag recorded along with the source digital image 101. This embodiment of the present invention is the most accurate since the noise properties of the class imaging device are accounted for by direct measurement. When an ISO speed setting meta-data tag is not available and the camera model type meta-data tag is available, the lowest ISO speed setting is used to select the noise characteristic table 204. When an ISO speed setting meta-data tag is available and the camera model type meta-data tag is not available, the corresponding ISO speed setting meta-data tag is used to select the noise characteristic table 204 based on the average digital camera as described above. It should also be noted that since new digital cameras are announced often, it is difficult to maintain the noise table database 202. Therefore, for some source digital images the camera model meta-data tag may be available but a corresponding noise characteristic table may not exist in the noise table database 202. This condition corresponds to the case described above for which no camera model meta data tag is available.

It is also possible that no meta-data tags are available. For this condition the noise characteristic table corresponding to the average digital camera can be used as measured for the ISO speed setting of 100.

Figure 3:
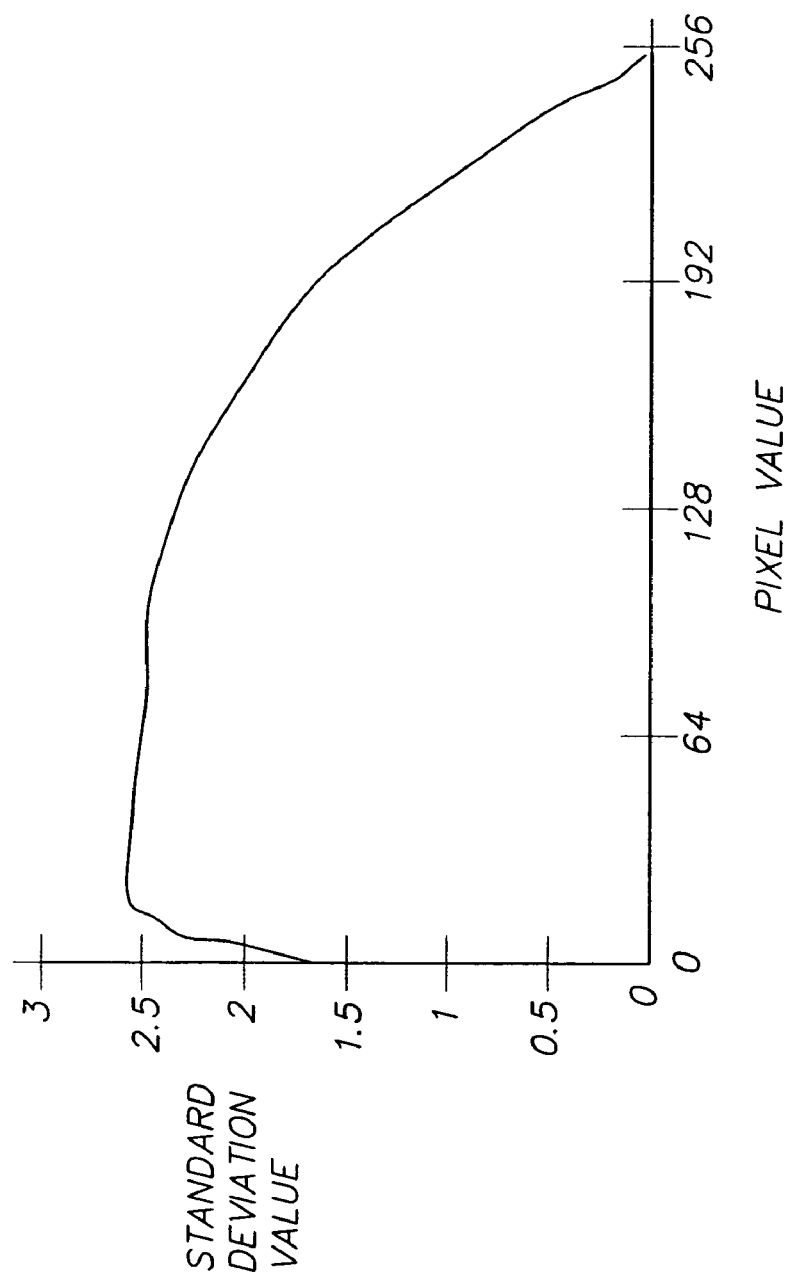
FIG. 3 shows a graph of an example noise characteristic table illustrating the relationship of the noise standard deviation as a function of pixel value.

The shape of a noise characteristic table for a typical digital camera is shown in FIG. 3. In an alternative embodiment of the present invention, the noise table data base 202 contains a reference noise characteristic table, such as the one illustrated in FIG. 3, and a set of red, green, and blue, noise table scaling factors ($F_r$, $F_g$, $F_b$) for each digital camera model for each ISO speed setting. The noise characteristic table 204 is generated by calculating a temporary noise characteristic table 204. This is achieved by multiplying the values in the reference noise characteristic table by the noise table scaling factors $F_r$, $F_g$, $F_b$, that correspond to the digital camera model and ISO speed setting. Red, green, and blue temporary noise characteristic tables 204 are generated. The noise table scaling factors are calculated by finding the best scaling factor for the given digital camera model and ISO speed setting. The best noise table scaling factors can be derived either by using the above procedure of photographing flat patch targets. Alternatively, the best noise table scaling factors can be derived by empirically varying the noise table scaling factors, processing the sample digital images with enhancement algorithms, printing the digital images, and making observations as to image quality. If a particular digital camera model is not available for testing but example digital images produced by the digital camera model are available, the empirical procedure for deriving the best noise table scaling factor may be the only choice. While this alternative embodiment of the present invention may not be as accurate as the preferred embodiment, it does have the advantage of simplicity. This can be important as the number of digital cameras on the market increases.

It should also be noted that different digital camera models that use the same image sensor type, such as a particular CCD or CMOS electronic devices, have very similar noise characteristics. This is principally due to the fact that the much of the noise imparted to a digital image comes from the mechanisms related to the image sensor type. For example, the maximum number of photons that can be recorded per pixel as a property of the image sensor type has a significant impact on the overall resultant noise magnitude present in the digital images produced with a image sensor type. Similarly, the dark current electron standard deviation property of a image sensor type also has a significant impact on the resultant noise magnitude. Therefore, the sensor type meta-data tag 103 can be used to select a noise characteristic table. This is accomplished by using different digital camera models that have the same sensor type, measuring the noise characteristics using these camera models as described above, and generating a noise characteristic table by using the collective statistics. Using the sensor type meta-data tab 103 to select the noise characteristic table is an advantage since the database of possible noise characteristic tables that the system must maintain is reduced.

The present invention can also be used to select the noise characteristic table 204 based on the ISO speed setting associated with a color negative or reversal film photographic film transparency material. For this implementation of the present invention, a meta-data tag is generated by a film scanner which reads the bar code pattern from the edge of the photographic film transparency material. The bar code pattern encodes the type of photographic film transparency material. A database of photographic film transparency material types is stored along with each film's associated ISO speed setting. A noise characteristic table is generated in the fashion described above by photographing a test target chart with a camera using a particular type of photographic film transparency material. The film scanner is used to generate source digital images from the photographic film transparency material and noise characteristic table is generated for the particular photographic film transparency material. When a sample of photographic film transparency material is received by the film scanner, the bar code pattern is read and interpreted. The film scanner generates the corresponding meta-data tag which is used to select the corresponding noise characteristic table to be used to process the source digital images derived from the sample of photographic film. Therefore, the bar code pattern constitutes non-pixel data, data that is not included in the pixels of the source digital image, that is used to select a noise processing parameter.

Some digital cameras can record a meta-data tag that indicates that the type of light source that influenced the original scene image was an artificial illuminant light source. Such a light source meta-data tag can be used to either modify the noise characteristic table or to select a noise characteristic table 204 from the noise table data base 202. The original scene light source can affect the relative noise among the R, G, and B records. Therefore the enhanced digital image can be further improved for image quality by incorporating this dependence into the noise characteristic table 204.

The method described above for generating the noise table base 202 which includes noise characteristic tables for different ISO speed settings is repeated using a tungsten light source. When the light source meta-data is available to the system, the light source meta-data tag and the ISO speed setting meta-data tag can be used to select a noise characteristic table 204 from the tungsten light source noise table database instead of the default noise table database as described above. Those skilled in the art will recognize that a noise table database 202 can be generated for any other type of artificial or natural light source and used in accordance with the present invention in so far as the light source meta-data tag can be produced by digital cameras and indicates the type of original scene light source.

The digital images produced by digital cameras have varying levels of noise present depending on the image compression method used to reduce the size of the image file used to encode the source digital image 101. In general, the more aggressive the image compression method used, the smaller the image file size and the less noise that will be present in the source digital image 101. The present invention can be used with source digital images that have been compressed using the JPEG (an acronym for "Joint Photographic Experts Group") standard image compression algorithm. The JPEG algorithm allows for varying degrees of achievable image compression.

The image file size corresponding to the source digital image 101 can be used as an indication of the aggressiveness of the image compression applied to the pixels of the uncompressed form of the source digital image. A compression ratio factor $R_c$ is calculated as the ratio of the size of the uncompressed image pixel data to the size of the compressed image file. The compression ratio factor is then used to indicate four categories of image compression aggressiveness: none, low, medium, and high. If the compression ratio factor is greater than or equal to 0.5, the compression category is set to none. If the compression ratio factor is greater than or equal to 0.15 and less than 0.5, the compression category is set to low. If the compression ratio factor is greater than or equal to 0.08 and less than 0.15, the compression category is set to medium. If the compression ratio factor is less than 0.08, the compression category is set to high.

The noise characteristic table 204 is selected using the procedure described above. The compression category assigned to the source digital image 101 is then used to calculate a temporary noise characteristic table by multiplying the selected noise characteristic table 204 by a compression scaling factor selected by the compression ratio category assignment. A compression scaling factor $J_c$ of 1.0, 0.8, 0.65, and 0.5 is used for the compression categories none, low, medium, and high respectively. It should be noted that the compression scaling factor $J_c$ was derived from measuring digital images produced by digital cameras. For a practical implementation of the present invention the numerical values for $J_c$ may need to be reevaluated as digital cameras evolve. The temporary noise characteristic table is then selected as the noise characteristic table 204 to be used for image enhancement. Alternatively, the compression scaling factor $J_c$ can be calculated by the mathematical formula (1):

$$J_c = 0.5 + 0.5/R_c \quad (1)$$

Those skilled in the art will recognize that the present invention can be used to advantage with other measures of image compression aggressiveness. For example, the JPEG quantization table encoded along with the image file from which the source digital image 101 is derived can be used to indicate the image compression aggressiveness. A single metric can be calculated from the 64 values of the JPEG quantization table to indicate the image compression aggressive. For example, the average JPEG quantization table value can be used. The compression scaling factor is then calculated by (2):

$$J_c = 0.5 + 0.5/Q_c \quad (2)$$

where $Q_c$ represents the average JPEG quantization table value corresponding to the source digital image 101. For both the compression category method and the JPEG quantization table method, the noise characteristic table can be varied or modified as a function of the aggressiveness with which the image compression algorithm has been applied to the source digital image 101. It should be noted that while the noise processing parameter can be varied in response to meta-data relating to the JPEG DCT algorithm, those skilled in the art will appreciate that for other image compression algorithms that affect the noise magnitude present in digital images, that an equivalent method can be developed. For example, the JPEG 2000 algorithm also includes quantization tables from which a compression scaling factor can be developed to achieve a similar effect.

Those skilled in the art will recognize that the present invention can also be practiced by generating and storing in the noise table database a noise characteristic table for each combination of digital camera model, ISO speed setting, and compression ratio factor. However, the preferred embodiment of the present invention uses the method of scaling existing noise characteristic tables for practical considerations.

Many digital cameras have an option that allows the user to select the pixel resolution of the digital images. In general, the magnitude of the noise present in the resulting digital images depends on the pixel resolution of the digital image. This is mainly due to the fact that the most common algorithm for producing a lower pixel resolution version of the captured pixel data includes an averaging spatial filter. Applying an averaging spatial filter to image pixel data has the effect of reducing the magnitude of the noise present. Empirical tests with different digital camera models has revealed that the magnitude of the noise is reduced by approximately 30 percent when the pixel resolution, total pixel count, is reduced by a factor of four.

The maximum pixel resolution $M_c$ is stored for each digital camera model in a database. A pixel resolution ratio factor is calculated as the ratio of the total pixels $T_c$ included in the source digital image 101 to the maximum pixel resolution. Both quantities $M_c$ and $T_c$ relate to the number of pixels of a single color of pixels. A pixel resolution scaling factor $P_s$ is then calculated as given by (3):

$$P_s = \omega^\eta \quad (3)$$

where the variable $\eta$ is given by (4)

$$\eta = \sqrt{Mc/Tc} \quad (4)$$

and the variable $\omega$ (set to 0.77) represents the average decimal reduction in noise magnitude corresponding to a reduction of a factor of four in pixel resolution.

The noise characteristic table 204 is selected using the procedure described above. The pixel resolution scaling factor $P_s$ calculated for the source digital image 101 is then used to calculate a temporary noise characteristic table by multiplying the selected noise characteristic table 204 by $P_s$. Therefore, the pixel resolution can be used to modify the noise characteristic table 204 and vary the image enhancement of the source digital image 101 on the basis of the pixel resolution of the source digital image 101.

Those skilled in the art will recognize that the present invention can also be practiced by generating and storing in the noise table database a noise characteristic table for each combination of digital camera model, ISO speed setting, and compression ratio factor. However, the preferred embodiment of the present invention uses the method of scaling existing noise characteristic tables for practical considerations.

Digital cameras have other features that the user can select that can affect the magnitude of noise present the source digital image. For example, some digital cameras have a digital zoom feature that produces a source digital image with a greater number of pixels than the photo sensor. When this option is selected, the pixels of the resultant source digital image must be interpolated from a digital image that has roughly the same number of pixels as the photo sensor. The interpolated pixels have, in general, less noise per pixel than the pixels from which they are interpolated since the interpolation process usually includes averaging two or more pixels. If a meta-data tag that indicates that the source digital image 101 has resulted from an interpolation process is received, the values in the noise characteristic table 204 are reduced by a scaling factor of 0.8.

Some digital cameras apply a noise reduction spatial filter to the pixel data before the source digital image is exported from the digital camera. A meta-data tag that identifies this condition can be received. The received meta-data tag 103 indicates that prior application of a noise reduction filter has occurred or has not occurred, i.e previous noise reduction processing history. When a source digital image is encountered for which no meta-data tag is present that indicates the prior application of a noise reduction filter having been applied to the source digital image, the noise characteristic table 204 is selected on the basis of camera ISO speed setting as described above. When a source digital image for which the meta-data tag is present is encountered, it indicates that a prior application of a noise reduction filter has been applied to the source digital image, the noise characteristic table 204 is selected on the basis of camera ISO speed setting as described above and scaled by a 0.7. Some digital cameras apply a noise reduction filter to the pixel data prior generating the digital image that is exported from the camera and do not set a meta-data tag 103 indicating this condition. For these cameras, the meta-data tag 103 can be set automatically using the camera model type meta-data tag.

Similarly, some digital cameras apply a sharpening spatial filter to the pixel data before the source digital image is exported from the digital camera. A meta-data tag that identifies this condition can be received. The received meta-data tag 103 indicates that prior application of a sharpening spatial filter has occurred or has not occurred, i.e. previous spatial sharpening processing history. When a source digital image is encountered for which no meta-data tag 103 tag is present that indicates the prior application of a sharpening spatial filter having been applied to the source digital image, the noise characteristic table 204 is selected on the basis of camera ISO speed setting as described above. When a source digital image is encountered for which the meta-data tag 103 is present and indicates that the prior application of a sharpening spatial filter has been applied to the source digital image, the noise characteristic table 204 is selected on the basis of camera ISO speed setting as described above and is scaled by a factor of 1.2.

An entire noise characteristic table can be received as a meta-data tag 103 along with the source digital image 101. For this case, the noise characteristic table 204 received as a meta-data tag 103 is selected instead of selecting a noise characteristic table from the noise table database 202. For this implementation of the present invention the meta-data tag 103 indicates the noise magnitude present in the source digital image directly.

The calculated noise characteristic table 204 is used in conjunction with spatial filters to produce an enhanced digital image 105 from the source digital image 101. A spatial filter is any method which uses pixel values sampled from a local region about a pixel of interest to calculate an enhanced pixel value which replaces the pixel of interest. Those spatial filters which reduce spatial modulation, for at least some pixels in an effort to remove noise from the processed digital image, can be considered noise reduction filters. Those spatial filters which increase spatial modulation, for at least some pixels in an effort to enhance spatial detail noise in the processed digital image, can be considered spatial sharpening filters. It should be noted that it is possible for a single spatial filter to be considered both a noise reduction filter as well as a spatial sharpening filter. The present invention can be used with any digital image processing method which makes uses of a noise characteristic table to produce an enhanced digital image 105. The standard deviation values contained in the noise characteristic table 204 can be used as a noise processing parameter to control a spatial filter. In particular, a noise reduction filter and a spatial sharpening filter are controlled. Both the spatial filters are non-linear spatial filters, i.e. the effect on a processed pixel is not a simple linear weighting of the surrounding pixel values. Those skilled in the art will recognize that other calculated or stored quantities can serve as a noise processing parameter.

Referring to FIG. 2, the preferred embodiment of the present invention employs a noise reduction module 120 as part of the image processing method to produce an enhanced digital image 105. As such, the source digital image 101 and the noise characteristic table 204 are received by the noise reduction module 120 which produces on output a noise reduced digital image.

It is important to note that for many practical digital imaging image systems, other image processing processors can be included. As long as these other image processing processors accept a digital image as input and produce a digital image on output, one more of these type of image processing processors can be inserted in the image processing chain in between a noise reduction module 120 and a spatial sharpening module 130.

According to one embodiment of the present invention a modified implementation of the Sigma filter, described by Jong-Sen Lee in the journal article *Digital Image Smoothing and the Sigma Filter*, Computer Vision, Graphics, and Image Processing Vol 24, p. 255–269, 1983, is used as a noise reduction filter to enhance the appearance of the processed digital image. The values of the pixels contained in a sampled local region, n by n pixels where n denotes the length of pixels in either the row or column direction, are compared with the value of the center pixel, or pixel of interest. Each pixel in the sampled local region is given a weighting factor of one or zero based on the absolute difference between the value of the pixel of interest and the local region pixel value. If the absolute value of the pixel value difference is less or equal to a threshold $\epsilon$, the weighting factor is set to one. Otherwise, the weighting factor is set to zero. The numerical constant $\epsilon$ is set to two times the expected noise standard deviation. Mathematically the expression for the calculation of the noise reduced pixel value is given as (5)

$$q_{mn} = \Sigma_{ij} a_{ij} p_{ij} / \Sigma_{ij} a_{ij} \tag{5}$$

and $$a_{ij} = 1 \text{ if } |p_{ij} - p_{mn}| <= \varepsilon$$

$$a_{ij} = 0 \text{ if } |p_{ij} - p_{mn}| > \varepsilon$$

where $p_{ij}$ represents the $ij^{th}$ pixel contained in the sampled local region, $p_{mn}$ represents the value of the pixel of interest located at row m and column n, $a_{ij}$ represents a weighting factor, and $q_{mn}$ represents the noise reduced pixel value. Typically, a rectangular sampling region centered about the center pixel is used with the indices i and j varied to sample the local pixel values.

The signal dependent noise feature is incorporated into the expression for $\epsilon$ given by equation (6):

$$\epsilon = Sfac\ \sigma_n(p_{mn}) \tag{6}$$

where $\sigma_n$ represents the noise standard deviation as given by the noise characteristic table 204 selected for the source digital image 101 evaluated at the center pixel value $p_{mn}$. The parameter Sfac is termed a scale factor and can be used to vary the degree of noise reduction. The calculation of the noise reduced pixel value $q_{mn}$ as the division of the two sums is then calculated. The process is completed for some or all of the pixels contained in the digital image channel and for some or all the digital image channels contained in the source digital image 101. The noise reduced pixel values constitute the noise reduced digital image. The modified implementation of the Sigma filter is an example of a noise reduction filter method that uses a noise characteristic table.

Referring to FIG. 2, the preferred embodiment of the present invention employs a spatial sharpening module 130 as part of the image processing method to produce an enhanced digital image 105. As such, the noise reduced digital image and the noise characteristic table 204 are received by the spatial sharpening module 130 which produces on output an enhanced digital image 105.

Although the present invention can be used any spatial sharpening filter which utilizes a priori knowledge of the noise characteristics, the preferred embodiment uses a modified implementation of the method described by Kwon et al in U.S. Pat. No. 5,081,692. This spatial sharpening method performs an un-sharp masking operation by filtering the input digital image with a spatial averaging 2-dimensional Gaussian filter (characterized by a standard deviation of 2.0 pixels) which results in a blurred digital image. The blurred digital image is subtracted from the input digital image to form a high-pass residual. In the method disclosed by Kwon et al. A local variance about a pixel of interest is calculated by using the pixel data from the high-pass residual. Based on the value of the local variance a sharpening factor is adjusted so as to amplify large signals more than small amplitude signals. The amplification factor $\phi$ is therefore a factor of the local variance v. i.e. $\phi(v)$.

The preferred embodiment of the present invention uses a modified version of the method taught by Kwon et al. to make the amplification factor $\phi(v)$ a function of the estimated noise, i.e. $\phi(v, \sigma_n)$. The amplification function $\phi$ is given by a gamma function, or integral of a Gaussian probability function, as given by equation (7):

$$\phi(v) = \frac{y_o + y_{max} \sum e^{-(v-v_o)^2/2s^2}}{y_o + y_{max} \sum e^{-(v_{max}-v_o)^2/2s^2}} \tag{7}$$

where $y_o$ represents a minimum amplification factor $y_{max}$ represents a maximum amplification factor, $v_{max}$ represents a maximum abscissa value of the variable v, $v_o$ represents a transition parameter and s represents a transition rate parameter. The variable $v_o$ is a function of the noise standard deviation value $\sigma_n$ as per equation (8):

$$v_o = Sfac_2 \sigma_n(p_{mn}) \tag{8}$$

where the scaling factor $Sfac_2$ determines the sensitivity of the sharpening sensitivity to the noise and the noise standard deviation value $\sigma_n$ is as given by the noise characteristic table 204. The optimal values for the variables used in equation (7) depend on the digital imaging application. The preferred embodiment of the present invention uses a value of 1.0 for $y_o$ which results in no spatial sharpening for noisy regions. A value of 3.0 is used for $y_{max}$, however, this variable is sensitive to user preference with values ranging from 2.0 to 4.0 producing acceptable results. The value of $Sfac_2$ should be set to between 1.0 and 2.0 with 1.5 as optimal. The variable s should be set to values in the range from $v_o/2$ to $v_o/10$ for reasonable results. The variable $v_{max}$ should be set to a value much larger than the expected noise, e.g. 20 time the value of $\sigma_n$.

The above description gives the details of how the preferred embodiment of the present invention selects and modifies a noise characteristic table on the basis of different meta-data in conjunction with receiving ISO speed setting meta-data. In an alternative embodiment of the present invention several meta-data generated by the digital camera, i.e. camera model type, image sensor type, type of light source, type of image compression, previous noise reduction processing history, previous spatial sharpening history, and number of image pixels, each can be used independently to determine the values in the noise characteristic table.

An approximate mathematical formula for each of these seven pieces of meta-data is given below that establishes a relationship between the associated meta-data and the expected noise magnitude. For each of the meta-data, a relative noise magnitude scaling factor is assigned a corresponding value individually for the red, green, and blue channels. The relative noise magnitude scaling factors for each meta-data item are multiplicatively cascaded into a single noise magnitude scaling factor S. This single noise magnitude scaling factor is then used to modify a reference noise characteristic table to generate a noise characteristic table that incorporates the dependence of the expected noise magnitude with respect to the variables.

For each piece of meta-data, a default relative noise magnitude scaling factor of 1.0 is set. Therefore, when a given piece of meta-data is not available, the corresponding relative noise magnitude scaling factors have no effect on the noise characteristic table values. The reference noise characteristic table is based on the average noise magnitude for DSC ISO 100 consumer grade digital cameras employing a JPEG compression algorithm with an expected 7:1 compression ratio.

The first piece of meta-data used in this alternative embodiment is the camera model type. Table 2 below illustrates the red, green, blue relative scaling factors for a few different camera types. For example, the professional grade camera, as indicated by entry A, has significantly less noise than that assumed for the reference noise characteristic table. The small relative noise magnitude scaling factors $S_T$ reflect the lower expected noise magnitude for images derived from this camera model type. The camera model type relative noise magnitude scaling factors are recorded individually for the red, green, and blue image channels.

TABLE 2

| Camera model | $S_T$ red channel | $S_T$ green channel | $S_T$ blue channel |
| --- | --- | --- | --- |
| default | 1.0 | 1.0 | 1.0 |
| A | 1.4 | 1.3 | 1.4 |
| B | 0.25 | 0.26 | 0.28 |
| C | 0.6 | 0.6 | 0.7 |
| D | 0.8 | 1.1 | 1.2 |

The second piece of meta-data used by this alternative embodiment is the operational ISO speed setting record by the digital camera at the time of capture. The relative noise magnitude scaling factors $S_I$ are list below in Table 3 for ISO speed settings corresponding to 50, 100, 200, 400, 800, and 1600. The ISO speed setting relative noise magnitude scaling factor is recorded as one value for the red, green, and blue image channels.

TABLE 3

| ISO setting | $S_I$ |
| --- | --- |
| default | 1.0 |
| 50 | 0.6 |
| 100 | 1.0 |
| 200 | 1.7 |
| 400 | 3.5 |
| 800 | 6.8 |
| 1600 | 12 |

The third piece of meta-data used by this alternative embodiment is a calculated quantity derived from the JPEG quantization table indicating the type of image compression. The average Q-table entry is calculated and used as meta-data to set a relative scaling factor related the aggressiveness of the JPEG compression used to encode the digital image. The values for this relative noise magnitude scaling factor SC are listed in Table 4. The type of image compression relative noise magnitude scaling factor is recorded as one value for the red, green, and blue image channels.

TABLE 4

| average Q-table value | $S_c$ |
| --- | --- |
| default | 1.0 |
| none | 1.2 |
| 5 | 1.1 |
| 10 | 1.0 |
| 20 | 0.8 |

The fourth piece of meta-data used by this alternative embodiment relates to the type of light source identified by the digital camera. This meta-data is categorized into unknown, daylight, tungsten, and fluorescent illumination types. The relative noise magnitude scaling factor SL relating to these types of illumination sources is listed in Table 5. The type of light source relative noise magnitude scaling factors are recorded individually for the red, green, and blue image channels along with the corresponding color temperature.

TABLE 5

| Light source | Color temperature (K) | $S_L$ of red channel | $S_L$ of green channel | $S_L$ of blue channel |
| --- | --- | --- | --- | --- |
| default | | 1.0 | 1.0 | 1.0 |
| Tungsten | 2650 | 0.7 | 1.0 | 1.5 |
| fluorescent | 3500 | 0.9 | 1.1 | 1.2 |
| daylight | 5500 | 1.0 | 1.0 | 1.0 |

The fifth piece of meta-data used by this alternative embodiment relates the size (image size as expressed in number of pixels) of the digital image being processed. This meta-data is used to set the window size for the noise reduction filter instead of setting a relative noise magnitude scaling factor. The window size settings for different spatial resolutions is listed in Table 6:

TABLE 6

| image resolution | window size of spatial filter for noise cleaning |
| --- | --- |
| <1 Mp | 7 |
| 1 Mp to 2 Mp | 11 |
| 2 Mp to 3 Mp | 13 |
| 3 Mp to 4 Mp | 15 |
| 4 Mp to 8 Mp | 17 | wherein the term Mp refers to millions of pixels.

The sixth piece of meta-data used by this alternative embodiment is the previous noise reduction processing history meta-data. If the meta-data indicates that the digital image has been previously processed, the relative noise magnitude scaling factor $S_n$ is set to 0.7. The previous noise reduction processing history relative noise magnitude scaling factor is recorded as one value for the red, green, and blue image channels.

The seventh piece of meta-data used by this alternative embodiment is the previous spatial sharpening processing history meta-data. If this meta-data indicates that the digital has been previously processed with a spatial sharpening filter, the relative noise magnitude scaling factor $S_s$ is set to 1.2. The previous spatial sharpening processing history relative noise magnitude scaling factor is recorded as one value for the red, green, and blue image channels.

In this alternative embodiment of the present invention, the system receives the camera meta data tags 103 relating to camera model type, ISO speed setting, type of lighting, type of compression, previous noise reduction processing history and previous spatial sharpening history and sets the relative noise magnitude scaling factors $S_T$, $S_I$, $S_L$, $S_C$, $S_N$, and $S_S$ respectively. The combined relative noise magnitude scaling factor S is given by (9).

$$S = S_T S_I S_L S_C S_N S_S \qquad (9)$$

In addition the image size meta data is used to set the window size for the noise reduction filter. The combined relative noise magnitude scaling factor S is used to scale the values in the reference noise characteristic table to generate a unique noise characteristic table for the source digital image being processed. Therefore, meta-data relating to camera model type, ISO speed setting, type of lighting, type of compression, previous noise reduction processing history, previous spatial sharpening history, and image size are employed to set a plurality of noise processing parameters that are used to enhance the spatial detail of the source digital image.

For a source digital image produced by camera A of Table 2, recorded at ISO 200 under tungsten illumination encoded with an average Q-table value of 10, with no meta-data tags indicating if either noise reduction or sharpening has already been performed will have corresponding relative noise magnitude scaling factors for the red, green, blue channels of 1.33, 1.77, and 2.86. For a source digital image produced by camera B of Table 2, recorded at ISO 1600 under daylight illumination encoded with no JPEG compression, with no meta-data indicating if either noise reduction or sharpening has already been performed will have corresponding relative noise magnitude scaling factors for the red, green, blue channels of 2.25, 2.34, and 2.52.

The probable use of the present invention can be detected using manipulated test digital images which include substantial regions free of spatial image content. The content free regions facilitates the computation of the noise characteristics of the image. For example, a first test digital image with its associated meta-data tags is sent to a digital photofinishing system in question, A copy of the image pixel data of the first digital image is made and different camera ISO, compression, lighting, and or resolution meta data tags are substituted for this second test digital image. Both the first and second test digital image are then sent to the digital photofinishing system in question for processing. The enhanced digital images produced by the digital photofinishing system in question are requested. The enhanced first and second digital images are digitally compared to determine if there are pixel differences in the fine spatial detail such as the noise in the image content free regions of the images. For example, the processed digital images can be filtered with a Laplacian spatial filter to reveal the fine spatial detail in the images. The Laplacian filtered images can then be compared to detect pixel differences. If on analysis, pixel differences do occur, these pixel differences can be attributable to the difference in the meta-data tags since the image pixel data for the two test digital images was identical. In this manner, pairs of test digital images can be used wherein the only difference between the two test digital images is a specific form of meta-data tag. If the digital photofinishing system in question does not service requests for returning the enhanced digital images, the resulting photographic prints can be analyzed by trained observers to look for any noise characteristic differences in the photographic print pairs.

The invention has been described in detail with particular reference to certain preferred embodiments thereof, but it will be understood that variations and modifications can be effected within the spirit and scope of the invention.

PARTS LIST 10 image capture device
20 digital image processor
30 image output device
40 general control computer
50 monitor device
60 input control device
70 offline memory device
101 source digital image
103 meta data
105 enhanced digital image
110 noise table selector
120 noise reduction module
130 spatial sharpening module
202 noise table database
204 noise characteristic table

What is claimed is:

1. A method of enhancing a digital image captured by a digital camera, comprising the steps of:
   a) providing one or more data selected from the group consisting of camera model type, image sensor type, type of light source, type of image compression, previous noise reduction processing history, previous spatial sharpening processing history, and camera noise magnitude;
   b) employing the one or more data to generate one or more noise processing parameters; and
   c) employing the one or more noise processing parameters to enhance the spatial detail of the digital image;
   further comprising the steps of providing photosensitivity data characterizing a digital camera image sensor, and also employing the photosensitivity data to generate the one or more noise processing parameters.

2. The method claimed in claim 1, wherein the photosensitivity data is ISO speed setting.

3. The method claimed in claim 1, further comprising the steps of providing the number of pixels in the image data and employing the number of pixels in the image data to generate the one or more noise processing parameters.

4. The method of claim 1, wherein the step of enhancing the spatial detail of the image includes using the noise processing parameters to control a spatial filter, and applying the spatial filter to the digital image.

5. The method of claim 4, wherein the spatial filter is a noise reduction filter that removes noise from a digital image.

6. The method of claim 4, wherein the spatial filter is a sharpening filter that enhances the spatial detail of a digital image.

7. The method of claim 4, wherein the spatial filter is a non-linear spatial filter.

8. The method of claim 1, wherein the noise processing parameter relates to the standard deviation of the expected noise magnitude present in the digital image.

9. The method of claim 1, wherein the digital image is a color digital image having color channels and further including the step of generating a noise processing parameter individually for each color channel.

10. The method of claim 1, wherein the step of generating the one or more noise processing parameters includes generating a plurality of noise processing parameters as a function of pixel value.

11. The method of claim 1, wherein the one or more data are recorded in an image file with the digital image.

12. The method of claim 11, wherein the digital camera records the one or more data.

13. The method of claim 1, wherein the one or more noise processing parameters are generated by using the one or more data to select from previously generated noise processing parameters.

14. The method of claim 1, wherein the one or more noise processing parameters are embodied in a noise characteristic table.

15. The method of claim 14, wherein the noise characteristic table is a table of noise standard deviation values.

16. The method of claim 1, wherein the enhancing step employs a sigma noise filter.

17. A method of enhancing a digital image captured by a digital camera, comprising the steps of:
  a) providing one or more data selected from the group consisting of camera model type, image sensor type, type of light source, type of image compression, previous noise reduction processing history, previous spatial sharpening processing history, and camera noise magnitude;
  b) employing the one or more data to generate one or more noise processing parameters; and
  c) employing the one or more noise processing parameters to enhance the spatial detail of the digital image;
  wherein the step of enhancing the spatial detail of the image includes using the noise processing parameters to control a spatial filter, and applying the spatial filter to the digital image;
  wherein the spatial filter is a noise reduction filter that removes noise from a digital image; and
  wherein the digital image includes pixel values and the noise reduction filter comprises the steps of:
  c1) calculating a pixel difference value as the absolute value difference between a pixel value to be enhanced and neighboring pixel values; and
  c2) using the pixel difference values and the noise processing parameter(s) to selectively average neighboring pixel values to calculate a noise reduced pixel value for the pixel to be enhanced.

18. A method of enhancing a digital image captured by a digital camera, comprising the steps of:
  a) providing one or more data selected from the group consisting of camera model type, image sensor type, type of light source, type of image compression, previous noise reduction processing history, previous spatial sharpening processing history, and camera noise magnitude;
  b) employing the one or more data to generate one or more noise processing parameters; and
  c) employing the one or more noise processing parameters to enhance the spatial detail of the digital image;
  wherein the step of enhancing the spatial detail of the image includes using the noise processing parameters to control a spatial filter, and applying the spatial filter to the digital image;
  wherein the spatial filter is a sharpening filter that enhances the spatial detail of a digital image; and
  wherein the digital image includes pixel values and the sharpening filter comprises the steps of:
  c1) calculating a variance value for a neighborhood of pixel values about a pixel value to be enhanced; and
  c2) using the calculated variance value and the noise processing parameter(s) to enhance the spatial detail of the digital image.

19. Apparatus for enhancing a digital image captured by a digital camera, comprising:
  a) a source of one or more data selected from the group consisting of camera model type, image sensor type, type of light source, type of image compression, previous noise reduction processing history, previous spatial sharpening processing history, and camera noise magnitude;
  b) means employing the one or more data for generating one or more noise processing parameters; and
  c) means employing the one or more noise processing parameters for enhancing the spatial detail of the digital image; and
  further comprising a source of photosensitivity data characterizing a digital camera image sensor, and means employing the photosensitivity data for generating the one or more noise processing parameters.

20. The apparatus claimed in claim 19, wherein the photosensitivity data is ISO speed setting.

21. The apparatus claimed in claim 19, further comprising a source of the number of pixels in the image data and means employing the number of pixels in the image data for generating the one or more noise processing parameters.

22. The apparatus of claim 19, wherein the means for enhancing the spatial detail of the image includes means using the noise processing parameters for controlling a spatial filter, and means for applying the spatial filter to the digital image.

23. The apparatus of claim 22, wherein the spatial filter is a noise reduction filter that removes noise from a digital image.

24. The apparatus of claim 22, wherein the spatial filter is a sharpening filter that enhances the spatial detail of a digital image.

25. The apparatus of claim 22, wherein the spatial filter is a non-linear spatial filter.

26. The apparatus of claim 19, wherein the noise processing parameter relates to the standard deviation of the expected noise magnitude present in the digital image.

27. The apparatus of claim 19, wherein the digital image is a color digital image having color channels and further including means for generating a noise processing parameter individually for each color channel.

28. The apparatus of claim 19, wherein means for generating the one or more noise processing parameters includes means for generating a plurality of noise processing parameters as a function of pixel value.

29. The apparatus of claim 19, wherein the source of the one or more data is an image file containing the digital image.

30. The apparatus of claim 29, wherein the digital camera includes means for recording the one or more data.

31. The apparatus of claim 19, wherein the one or more noise processing parameters are generated by using the one or more data to select from previously generated noise processing parameters.

32. The apparatus of claim 19, wherein the one or more noise processing parameters are embodied in a noise characteristic table.

33. The apparatus of claim 32, wherein the noise characteristic table is a table of noise standard deviation values.

34. The apparatus of claim 19, wherein the enhancing means employs a sigma noise filter.

35. Apparatus for enhancing a digital image captured by a digital camera, comprising:
 a) a source of one or more data selected from the group consisting of camera model type, image sensor type, type of light source, type of image compression, previous noise reduction processing history, previous spatial sharpening processing history, and camera noise magnitude;
 b) means employing the one or more data for generating one or more noise processing parameters; and
 c) means employing the one or more noise processing parameters for enhancing the spatial detail of the digital image;
 wherein the means for enhancing the spatial detail of the image includes means using the noise processing parameters for controlling a spatial filter, and means for applying the spatial filter to the digital image;
 wherein the spatial filter is a noise reduction filter that removes noise from a digital image; and
 wherein the digital image includes pixel values and the noise reduction filter comprises:
 c1) means for calculating a pixel difference value as the absolute value difference between a pixel value to be enhanced and neighboring pixel values; and
 c2) means for using the pixel difference values and the noise processing parameter(s) to selectively average neighboring pixel values to calculate a noise reduced pixel value for the pixel to be enhanced.

36. Apparatus for enhancing a digital image captured by a digital camera, comprising:
 a) a source of one or more data selected from the group consisting of camera model type, image sensor type, type of light source, type of image compression, previous noise reduction processing history, previous spatial sharpening processing history, and camera noise magnitude;
 b) means employing the one or more data for generating one or more noise processing parameters; and
 c) means employing the one or more noise processing parameters for enhancing the spatial detail of the digital image;
 wherein the means for enhancing the spatial detail of the image includes means using the noise processing parameters for controlling a spatial filter, and means for applying the spatial filter to the digital image;
 wherein the spatial filter is a sharpening filter that enhances the spatial detail of a digital image; and
 wherein the digital image includes pixel values and the sharpening filter comprises:
 c1) means for calculating a variance value for a neighborhood of pixel values about a pixel value to be enhanced; and
 c2) means for using the calculated variance value and the noise processing parameter(s) to enhance the spatial detail of the digital image.

37. A software program product embodied in a computer readable medium for performing the method of claim 1.

38. A method of enhancing a digital image captured by a digital camera, comprising the steps of:
 a) providing a plurality of data selected from the group consisting of camera model type, image sensor type, type of light source, type of image compression, previous noise reduction processing history, previous spatial sharpening processing history, and photosensitivity data characterizing a digital camera image sensor;
 b) employing the plurality of data to generate for each data a relative noise magnitude scaling factor;
 c) employing the plurality of relative noise magnitude scaling factors to enhance the spatial detail of the digital image.

39. The method claimed in claim 38, wherein the step of enhancing the spatial detail further comprises the steps of:
 c1) combining the plurality of relative noise magnitude scaling factors into a single noise scaling factor;
 c2) using the single noise scaling factors to generate one or more noise processing parameters; and
 c3) employing the one or more noise processing parameters to enhance the spatial detail of the digital image.

* * * * *